(12) United States Patent
Tortosa et al.

(10) Patent No.: US 9,830,319 B1
(45) Date of Patent: Nov. 28, 2017

(54) HIERARCHICAL DATA EXTRACTION MAPPING AND STORAGE MACHINE

(71) Applicant: 8KDATA TECHNOLOGY S.L., Madrid (ES)

(72) Inventors: Álvaro Hernández Tortosa, Madrid (ES); Yeray Darias Camacho, Santa Cruz de Tenerife (ES); Matteo Melli, Madrid (ES); Gonzalo Ortiz Jaureguizar, Madrid (ES); Jerónimo López Bezanilla, Madrid (ES)

(73) Assignee: 8KDATA TECHNOLOGY S.L., Madrid (ES)

( * ) Notice: Subject to any disclaimer, the term of this patent is extended or adjusted under 35 U.S.C. 154(b) by 0 days.

(21) Appl. No.: 15/585,929

(22) Filed: May 3, 2017

(30) Foreign Application Priority Data

Nov. 18, 2016 (ES) .................................. 201631481

(51) Int. Cl.
*G06F 17/30* (2006.01)
(52) U.S. Cl.
CPC .. *G06F 17/30011* (2013.01); *G06F 17/30339* (2013.01); *G06F 17/30604* (2013.01)

(58) Field of Classification Search
CPC ............... G06F 17/30339; G06F 17/30; G06F 17/30604; G06F 17/30011
USPC .................................................. 707/600–899
See application file for complete search history.

(56) References Cited

U.S. PATENT DOCUMENTS

2016/0342657 A1* 11/2016 Pike .................... G06F 11/1482

* cited by examiner

*Primary Examiner* — Isaac M Woo
(74) *Attorney, Agent, or Firm* — Leason Ellis LLP

(57) ABSTRACT

The present disclosure concerns systems and methods and computer program products for processing hierarchical document data (e.g., XML, JSON documents) and storing them in relational database structures. The methods herein read input document data and analyze the schema of the document to create both dynamic data tables and metadata tables for the destination tabular structure storage. Thereafter, the key-value data stored in the document is extracted, transformed, and mapped to a generated table structure that references the metadata tables. In this way, information can be stored in tabular or relational databases or structures and reconstructed into the original document if necessary.

16 Claims, 13 Drawing Sheets

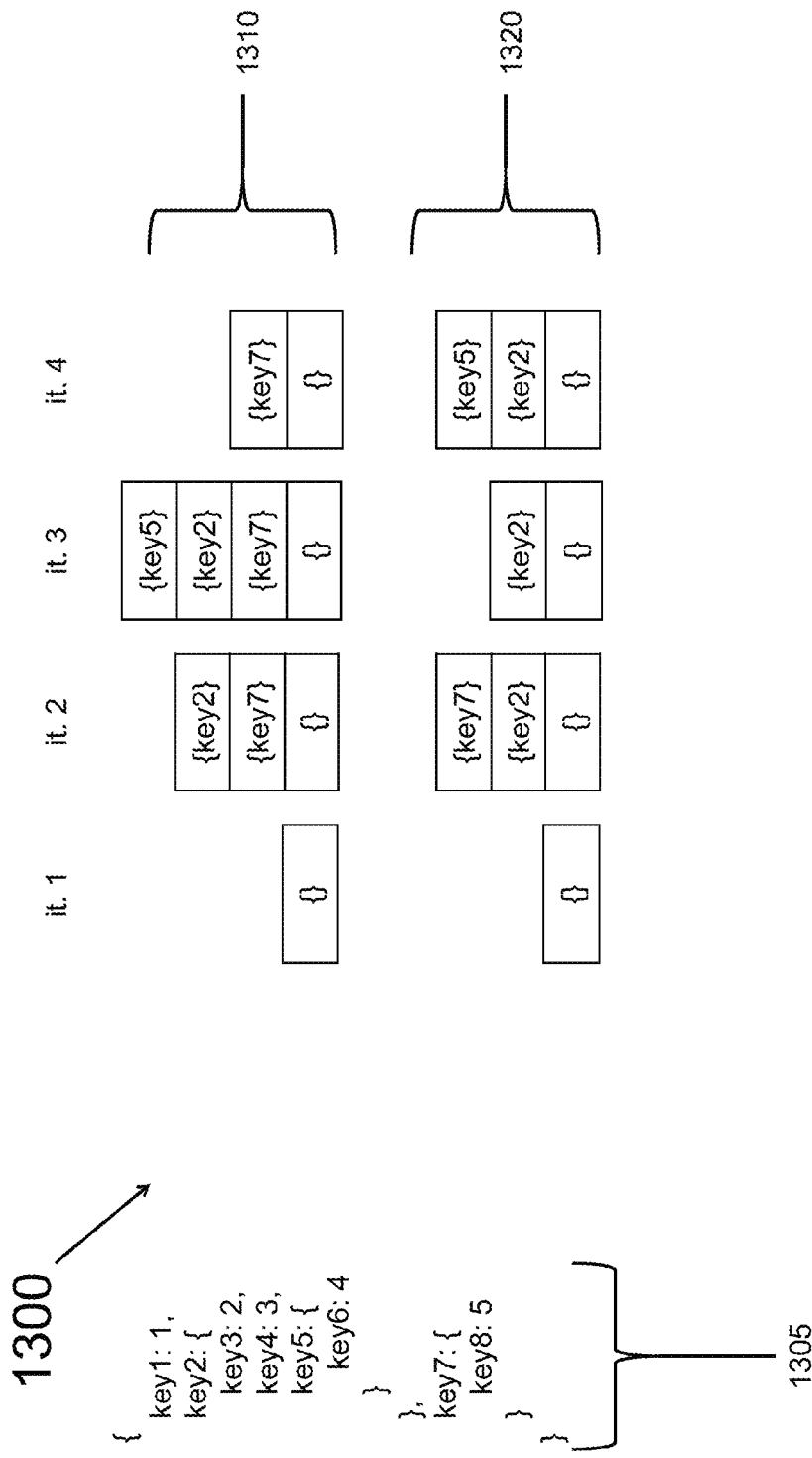

HIERARCHICAL DATA EXTRACTION MAPPING AND STORAGE MACHINE

CROSS-REFERENCE TO RELATED PATENT APPLICATIONS

This application claims priority of Spanish Application No. P201631481, filed Nov. 18, 2016, which is hereby incorporated by reference in its entirety.

FIELD OF THE INVENTION

The invention described herein generally relates to systems and methods for storing, transforming and extracting data from or to a data sources that uses, at least in part, tabular data structures. In particular, the invention relates to systems and methods for storing, transforming and extracting data from documents stored in structured and unstructured data sources.

BACKGROUND OF THE INVENTION

NoSQL databases, semi-structured data processing and storage systems, and other so-called schema-less software, accept nested key-value data structures, or "documents," as input. These documents are a convenient way to represent data of a hierarchical nature, in which few or no restrictions are imposed on the contents or the structure (schema) of the data. In particular, the structure, contents and keys of different documents, even if logically grouped together, can be completely different one from each other.

A document structure can include a set of key-value pairs, in which the key is a name (e.g., a string) and the value can be a scalar value (e.g., numbers, text, Booleans, empty values, etc.) or a composite value. Composite values include nested values, such as embedded documents or collections of other scalar or composite values. For particular software processes, key-value pairs may be formatted as a single, indivisible, serialized unit of nested key-value structures. The data (e.g., the value) contained in the document is typically accessed via one or more keys (though a key is not necessarily required for data access).

Conventional document data access is performed via accessing (e.g., querying) the data via an (external) index that indexes the primary key or another field or fields of the document. However, conventional document data access is not always desired, optimal, or possible in certain data access scenarios, such as non-indexed queries, aggregate queries or data in nested fields or nested documents within the data. In these situations, the document data access methods implemented are computer resource inefficient (e.g., long CPU time and high memory use). More specifically, any non-indexed query to a collection of documents requires a full collection scan operation. Full collection scan operations require parsing all the data document by document, key by key, until a match with the query predicate is found on a per document basis. This operation includes the technical drawbacks of long processing times, the creation of frequent bottlenecks on either I/O or CPU, and exhibits a poor cache pattern usage.

In addition to the foregoing, present systems encounter difficulty when processing documents that have disparate schema or are schema-less due to the fact that the structure used must be defined on a per-document basis. If documents within a given set of documents share an underlying equal or similar enough structure, a significant processing overhead is incurred by unnecessarily redefining the schema, which leads to space, memory and processing bloat.

As such, there exists a need for systems and methods that extract, transform and store document data from a data source in which the documents have varying schema or are schema-less to improve computer resource management. Further, there exists a need for systems and methods that can perform document data processing on hierarchical, nested key-value data.

It is in regard to these issues and others that the present invention is provided.

SUMMARY OF THE INVENTION

In one aspect, embodiments of the invention are directed toward a method for mapping one or more key-value pairs associated with a document into one or more tabular structures, the one or more key-value pairs each having a key name and a value, and each of the one or more tabular structures having one or more rows and columns for storing the values. For example, the tabular structure can be a persistent storage. According to one or more embodiments, the method comprises reading the document, by a document reader, to identify the one or more key-value pairs associated with the input document. For example, the document can be input from a data source, such as a database, and can be in many formats, such as JSON or XML. Next, the method determines whether a value associated with a given one of the one or more key-value pairs is a scalar value or a composite value.

In the event that the value associated with the key-value pair is a scalar value, the method performs the steps of extracting the key name of the key-value pair and storing the value of the key-value pair in a row of the tabular structure. In one embodiment, the method further performs the step of checking whether the tabular structure has a column associated with the extracted key name of the key-value pair. This can include generating a new column associated with the tabular structure and storing the value of the key-value pair in a row of the tabular structure. In some embodiments, the column is identified by a type associated with the value of the key-value pair.

In the event that the value associated with the key-value pair is a composite value, the method performs the steps of extracting the key name of the key-value pair and generating a sub-tabular structure associated with the extracted key name of the key-value pair. In some embodiments, in the event that the value associated with the key-value pair is a composite value, the method further performs the step of pushing the value of the key-value pair to a temporary data structure. In other embodiments, the method performs the step of recursively iterating the foregoing steps until each of the one or more key-value pairs has been extracted to a tabular or sub-tabular structure.

Moreover, the method in one or more embodiments further comprises processing nested key-value pairs in composite values that were pushed to a temporary data structure. For example, the temporary data structure can be a stack operation or linked list. More particularly, the method determines whether the composite value associated with a key-value pair pushed to the temporary data structure includes one or more sub-key-value pairs. Further, the method determines whether the one or more sub-key-value pairs are a scalar value or a composite value for each of the one or more sub-key-value pairs. In the event that the value associated with the sub-key-value pair is determined to be a scalar value, the method performs the steps of extracting the key name of the sub-key-value pair and checking whether the sub-tabular structure has a column associated with the extracted key name of the sub-key-value pair.

Continuing with the foregoing, if the check evaluates to true, the method continues by performing the step of storing the value of the sub-key-value pair in a row of the sub-tabular structure and mapping the value of the sub-key-value pair to the column. If not, the method performs the step of generating a new column associated with the sub-tabular structure, storing the value of the sub-key-value pair in a row of the sub-tabular structure and mapping the value of the sub-key-value pair to the new column. In the event that the value associated with the sub-key-value pair is a composite value, the method performs the steps of extracting the key name of the sub-key-value pair, generating a new sub-tabular structure associated with the extracted key name of the sub-key-value pair, and pushing the value of the sub-key-value pair to the temporary data structure. After processing of the sub-key-value pairs, the method performs the step of removing the pushed key-value pair from the temporary data structure. The foregoing steps may be iterated until the temporary data structure contains no pushed key-value pairs.

In another aspect, embodiments of the invention are directed toward systems for extracting and storing document data into a database. In one or more embodiments, the system comprises a data processing apparatus including a processor and a memory coupled to the processor. Further, the system includes a data source containing one or more documents. Each document contains one or more key-value pairs, and each key-value pair has a key name and a value, in which each value has a value type. Moreover, the system includes a document reader for receiving the document from the data source over a network, the document reader being communicatively coupled to the data processing apparatus. Additionally, the system comprises a structure extraction module.

The structure extraction module implements program code by the processor to generate one or more tabular structures having at least one column corresponding to the key name and value type of each of the one or more key-value pairs. Likewise, the system comprises a data extraction module. The data extraction module implements program code by the processor to extract the value to a data row in the one or more tabular structures created by the structure extraction module. Finally, the system comprises one or more metadata tables generated by the structure extraction module with reference to the one or more tabular structures.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 13 presents an illustration depicting an exemplary stack operation according to one embodiment of the present invention.

DETAILED DESCRIPTION OF THE INVENTION

Figure 1:
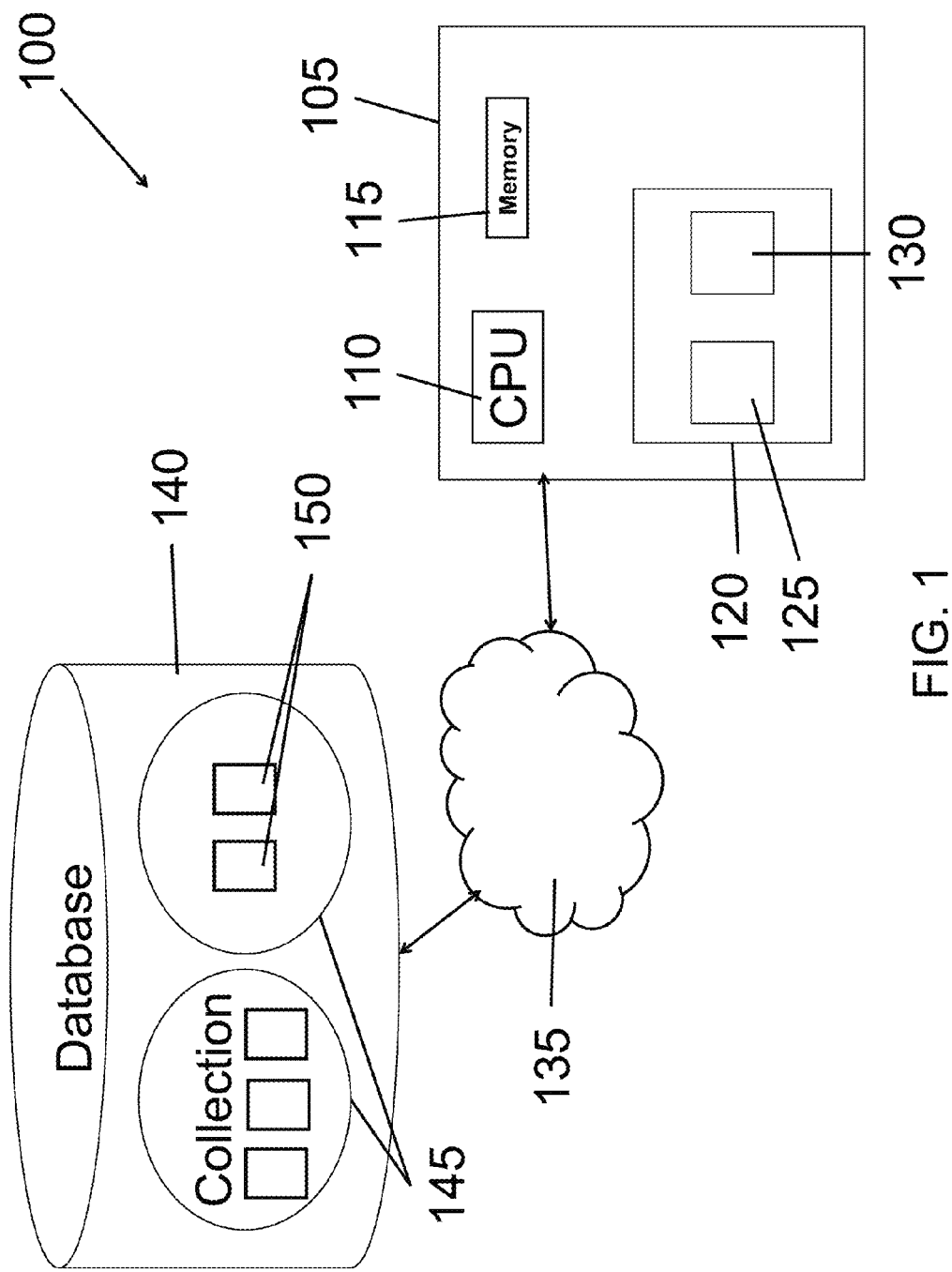
FIG. 1 presents a block diagram illustrating a system for mapping document data to tabular structures according to one embodiment of the present invention.

Throughout the specification and claims, terms may have nuanced meanings suggested or implied in context beyond an explicitly stated meaning. Likewise, the phrase "in one implementation" or "in one embodiment" as used herein does not necessarily refer to the same implementation or embodiment and the phrase "in another implementation" or "in another embodiment" as used herein does not necessarily refer to a different implementation or embodiment. Similarly, the phrase "one or more implementations" or "one or more embodiments" as used herein does not necessarily refer to the same implementation or embodiment and the phrase "at least one implementation" or "at least one embodiment" as used herein does not necessarily refer to a different implementation or embodiment. The intention is, for example, that claimed subject matter include combinations of example implementations and embodiments in whole or in part.

Systems and methods for mapping data associated with a document, e.g., one or more key-value pairs, into one or more tabular structures or other relational data format is provided herein. As used herein, a "document" is a set, not necessarily ordered, of key-value pairs, where the key is a data identifier (e.g., a name) and the value is either a scalar value or a composite value. Composite values can be heterogeneous or homogeneous nested documents or collections of other scalar and/or composite values. For example, a composite value can be an array or subdocument contained within a document. Documents include stored data in one or more document levels. For example, each document has a root or base level. Beyond that, the document includes at least one sub-level for each key-value pair stored at the root level that has a composite value. Sub-levels can include further composite key-value pairs and thus the document can include as many levels as it has nested subdocuments. Moreover, documents can be grouped into one or more collections that, in turn, can be grouped into databases. A collection can include grouped documents having a relationship with each other (e.g., the same document type) or grouped documents having no relation at all.

In particular, the systems and methods described herein improve upon conventional practices for storing unstructured document data by transforming unstructured document data into tabular structured data or other relational system data. A tabular structure is a possibly persistent storage that groups data into tables. A table is composed of rows and columns. Each register or tuple is stored in a row, and the columns define each attribute of the tuple via a name and type. For example, the value of a key-value pair is stored in a table row and associated with a particular column that is defined according to the key name and value type (e.g., integer, double, string, character, Boolean, etc.) of the key-value pair.

In one aspect of the present invention, the systems and methods as shown and described herein include two parallel data processing processes. First, the present application details methods for extracting data structure from a document and then for dynamically generating and/or updating tabular structure (e.g., tables) to represent the contents of the document data based on the extracted data structure. In one or more embodiments, the methods provided herein define metadata information on corresponding metadata tables, such metadata information referencing the extracted data structures, so that the tabular structure is dynamically updated according to newly input document data accordingly with correct reference to data already stored. Second, the present application details methods to read document data to create and store the data records in the tabular structures generated by the first data processing process. This includes documents having composite values, such as nested documents (e.g., a key-value pair having a value that is a document itself). The present methods as shown and described herein generate additional tables for each key-value pair having nested documents.

Information is represented as a set of tabular data or relational tables in a relational system according to the schema design of the system. Classifying data in this manner allows querying without a full database scan, as only the tables or the subset of data in the tables are targeted to satisfy the query criteria, resulting in improved query performance, less I/O and CPU bottleneck and better cache usage compared to conventional practices for handling unstructured hierarchical or nested document data. For example, a tabular or relational system, as shown and described herein, defines table and column information once, which advantageously achieves a significant storage and cache reduction compared to equivalent data stored in conventional NoSQL databases.

FIG. 1 illustrates a system 100 for mapping data source data to tabular structures according to one or more embodiments of the present invention. The system 100 includes a data processing apparatus 105 having a processor 110, a memory 115 coupled to the processor, and one or more software modules 120 that implement, by the processor, program code stored in the memory to perform aspects of data mapping as shown and described herein. For example, software modules 120 can include a structure extractor 125 for generating tabular structures for storing data and a data extractor 130 for extracting data contained in a document and storing such extracted data into a generated tabular structure. Data processing apparatus 105 can include, for example, servers, personal computer such as laptop computers and/or desktop computers, and mobile computing devices such as tablet computing devices, smartphones, personal digital assistants or the like. The memory 115 may be used for storing data, metadata, and programs for execution by the processor 110. The memory 115 may include one or more of volatile and non-volatile memories, such as Random Access Memory ("RAM"), Read Only Memory ("ROM"), Flash, Phase Change Memory ("PCM"), or other type.

The data processing apparatus 105 is configured to access a data source 140. The data source 140 can be local to the data processing apparatus 105, or remote, in which the two are in connection over a network 135 (e.g., wired or wireless network, 3G/4G network, etc.). In one or more implementations, the data source 140 is a database. For example, the data source 140 can be a relational database. Data stored in the data source 140 is stored in one or more collections 145, each collection having one or more documents 150. Documents 150 include unstructured stored data along document pathways in the form of a set of key-value pairs, in which each key-value pair includes a key (or "key name") that is an identifier representing a data value associated with that key. The data value (or "value") can be a scalar value (e.g., an integer, double, string, character, float, Boolean, empty value, etc.) or a composite value (e.g., an array, record, set, function, nested value, etc.). For example, a key-value pair can comprise a string, e.g., a book name, and a value corresponding to that string, e.g., 'The Martian'. A document is structured to first contain key-value pairs in a root level. If a document includes nested data in a root level (or any sub-level), that is, a key-value pair having a composite value (e.g., another key-value pair), then that data is stored in a sub-level. In one or more embodiments, a document 150 is stored in a particular data exchange format. For example, the document 150 can be stored in JAVASCRIPT Object Notation ("JSON"), Extensible Markup Language ("XML"), Resource Description Framework ("RDF"), YAML, Rebol, or Gellish.

Figure 2:
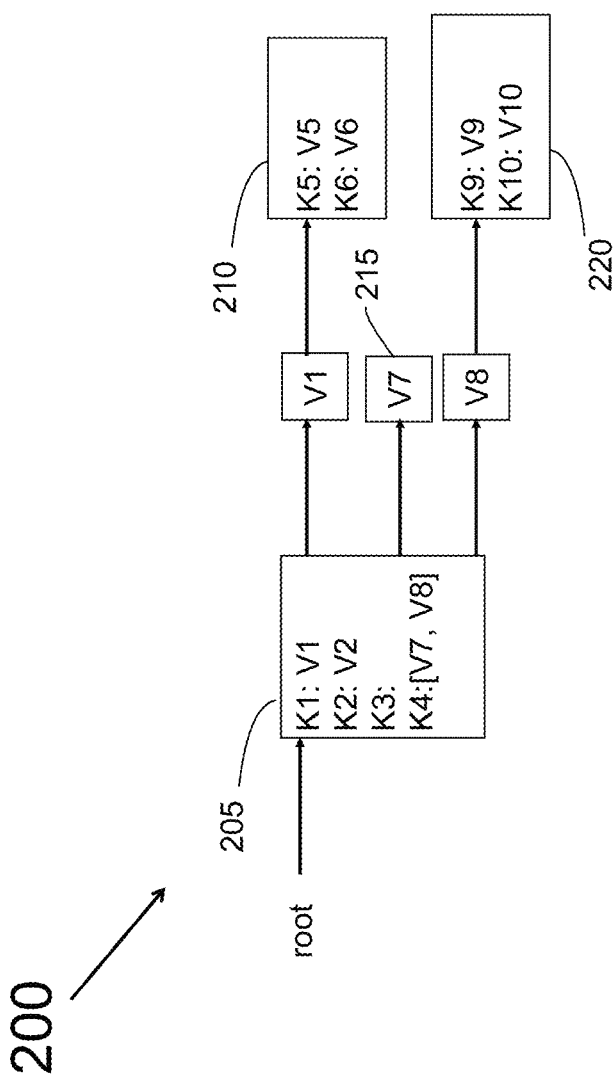
FIG. 2 presents an illustration depicting an exemplary key-value pair hierarchy according to one embodiment of the present invention.

FIG. 2 illustrates the structure of an exemplary key-value pair hierarchy of an example document 200 according to one or more embodiments herein. In the example document 200, a root level 205 includes four key-value pairs, denoted by K1, K2, K3, and K4. The K1 key-value pair has a value of V1, which is a composite value. In the example illustration, V1 contains two nested key-value pairs, K5 and K6, which are stored at a first sub-level 210. The K2 key-value pair has a value of V2, which is a scalar value, and thus has no sub-levels associated with it. The K3 key-value pair has an empty value associated with it, which also means that it has no sub-levels associated with it. The K4 key-value pair has a value of [V7, V8], which is an array (a composite value). Arrays are stored in sub-levels, and FIG. 2 illustrates that the K4 array stores the scalar V7 value in a second sub-level 215 and the composite V8 value in a third sub-level 220. V8 contains two scalar key-value pairs, K9 and K10, and with no further composite values identified, the document is fully stored.

Figure 3:
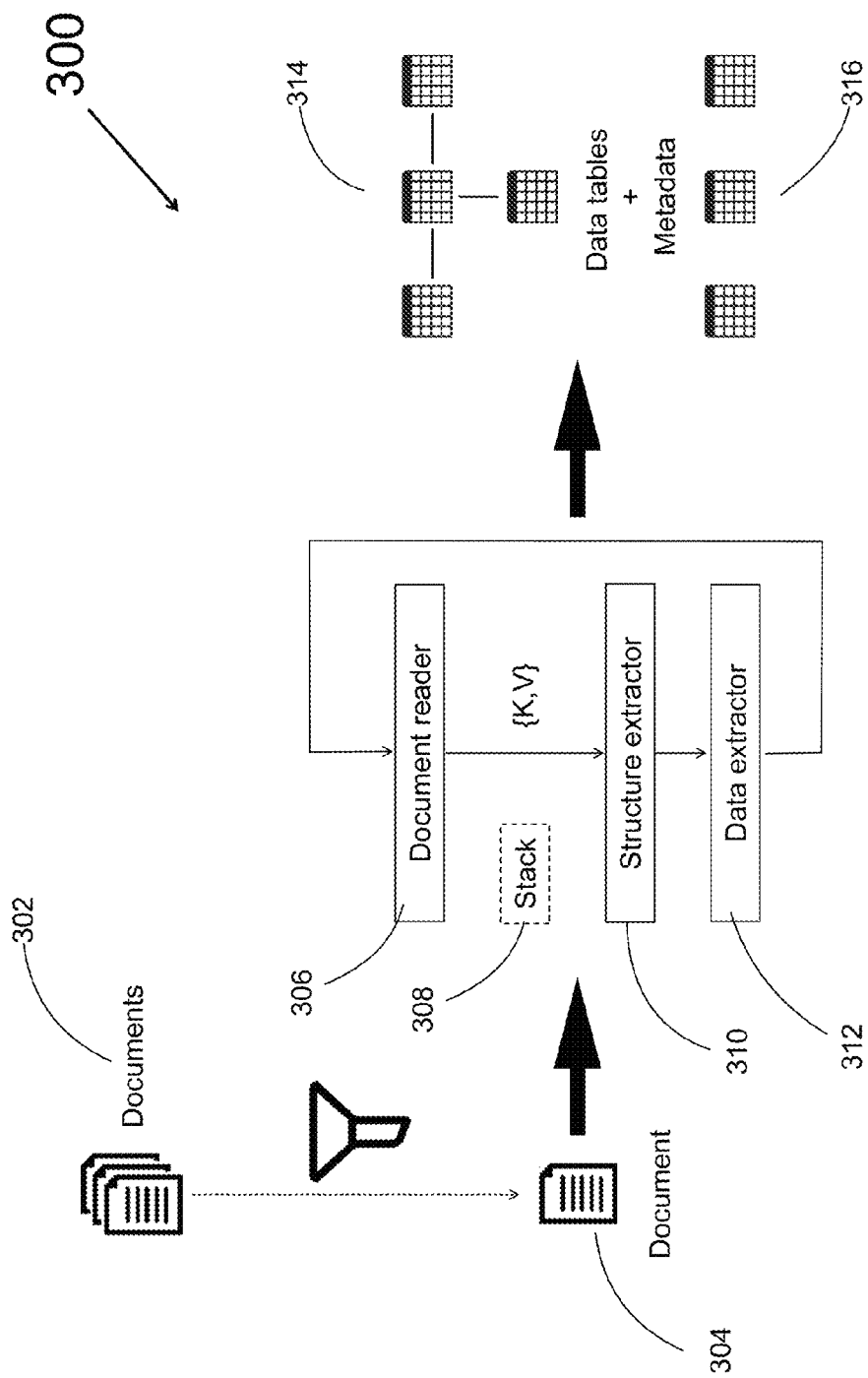
FIG. 3 presents an exemplary method flow for mapping document data to a tabular structure according to one embodiment of the present invention.

With reference now to FIG. 3, a method 300 for mapping document data in the form of one or more key-value pairs associated with the document into one or more tables of a tabular structure according to one or more embodiments is provided. The method 300 description assumes an initial empty system, that is, with no existing data or metadata tables. However, the method is not limited to initial empty systems, and can be implemented with systems in any given previous state. In this way, the method can be employed on persistent, durable systems in which the information and metadata persist across reboots and system crashes. Moreover, referenced metadata can be used later to assemble back the original document data and/or use it as-is for data access.

The method 300 begins at step 302, in which one or more documents are provided for processing. In one or more embodiments, the documents are pulled from a data store, such as in a database (e.g., data source 140). For example, the documents can be one or more JSON or XML files. In other embodiments, the documents are provided locally, such as by memory 115. For example, a user may input information into a locally stored document at the data processing device 105 via an input device, such as a keyboard. At step 304, a particular document is selected as input. For example, a document can be selected via document filtering, as is known to those of ordinary skill in the art, or by any other selection process (e.g., first in/first out, first in/last out, alphabetical order, etc.). The selected document is passed to a document reader, step 306. A document reader reads documents to identify data stored within the document for processing and storage into a table. For example, the document reader identifies key-value pairs stored within the document at a root level. The document reader can be any data-reading device, such as data processing apparatus 105.

At step 310, the identified document data is analyzed to determine if the data includes composite values. In one or more implementations, the composite value data is stored in a temporary data structure (a stack 308 in the given implementation). For example, if the document reader identifies a key value pair having a value that is a nested document or array, the value is pushed to a temporary data structure, such as a stack, until all key-value pairs having scalar values at a particular document level are processed. The temporary data structure is not limited to stack methodology, but can include other elementary data structures such as link lists, double link lists, arrays, queues, etc. A stack structure is not preferred, but is an operative embodiment as described herein. Document data analysis, however, (and process data, as in subsequent steps) does not require a temporary data structure. In other embodiments, programmatic techniques are implemented to determine composite value data. Exemplary programmatic techniques falling within the scope of embodiments of the present invention include, but are not limited to, recursion.

Continuing with FIG. 3, the method 300 processes non-composite value document data at the present document level to generate and populate tabular structures. Non-composite (e.g., scalar value data) is processed first as a document can have key-value pairs stored at multiple nested levels beyond a root (e.g., base, non-nested) level. In this way, processing all of the scalar value data before stepping to the next sub-level ensures that no key-value pair is omitted from processing. In one or more embodiments, the method implements existing tabular structures, generates tabular structures, or implements a combination of existing and generated tabular structures depending on whether the destination storage system (e.g., a relational database) already includes a reference to a tabular structure for that data. For each composite value (or "sub-document") the method generates a reference to an additional tabular structure (or "sub-tabular structure" or "sub-table") that is used for storing sub-level data.

The structure extractor generates a reference to a table. For example, the structure extractor is structure extractor 125. The reference to a table provides read and write access to the table and can refer to a pre-existing table or generate a table in view of the key name and value type of the key-value pair (e.g., metadata). In one or more embodiments, the columns of the table are associated with metadata. The structure extractor also generates a data row for data storage in the table, in which the row is mapped to particular table columns. Next, the method 300 continues in which a data extractor extracts the value of the key-value pair, step 312. Then, the method 300 stores the extracted data value in the table, step 314, and references the value by a set of corresponding metadata, step 316. For example, each singleton key-value pair (e.g., scalar value) in a document level is processed and stored in a particular row and column according to a metadata reference in a metadata table (e.g., key-value pair type and name). The method 300 then iterates for each scalar value in the present document level. If the present document level identifies composite value data, the method 300 processes composite values by pushing them to a temporary data structure (e.g., a stack 308). Once all scalar value key-value pairs have been processed, the method steps to a sub-level of the document path in accordance with an identified composite key-value pair in the temporary data structure and performs the method again. This can include generating and populating sub-tables that are associated with the root-level tables.

Figure 4:
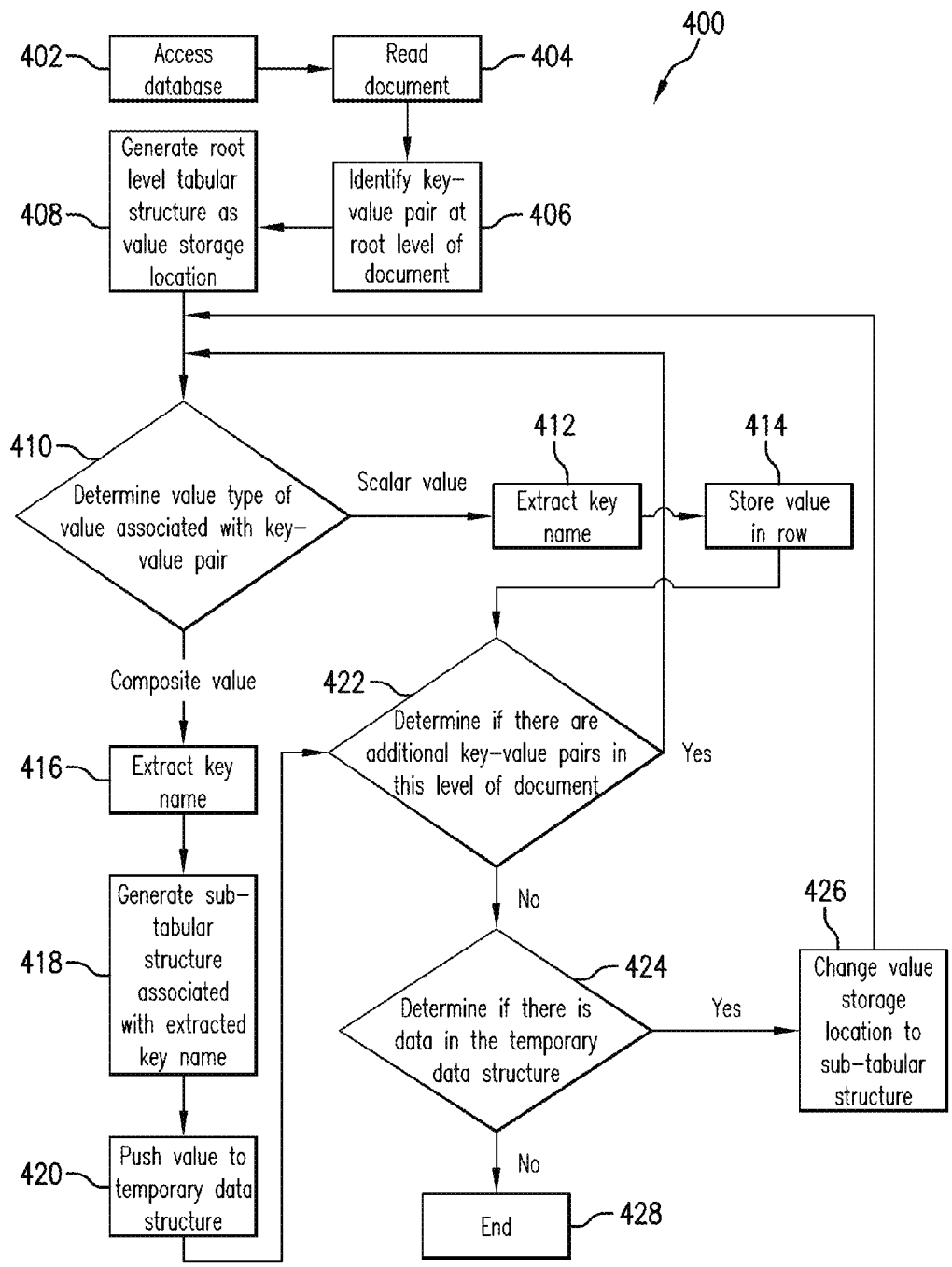
FIG. 4 presents a method flow illustrating mapping one or more key-value pairs associated with a document into one or more tabular structures according to one embodiment of the present invention.

With reference now to FIG. 4, a method flow 400 illustrates mapping one or more key-value pairs associated with a document into one or more tabular structures according to a particular embodiment. In this exemplary method flow, a document having one or more key-value pairs is analyzed first at a root level of a document path, and the values of scalar key-value pairs at the root level are processed and stored in tabular structures. The values of composite key-value pairs are pushed to a temporary data structure until the root level processing is complete, and then the method 400 steps to sub-levels to process the composite key-value pairs in further sub-tabular structures that reference higher level tabular structures depending back to the root level.

More particularly, the method flow 400 begins at step 402 in which a data processing device accesses a data source having one or more documents. Each document typically has one or more key-value pairs, though the method 400 can process documents having no data stored. In that case, the method 400 either produces no tabular structures, or produces a single empty tabular structure, depending on the implementation. Further, each document has one or more document levels depending on whether there are nested subdocuments (e.g., composite key-value pairs) contained within the document data. The method 400 is capable of processing nested values into as many sub-tabular structures as there are nested levels. At step 404, a particular document from the data sources is read. In one or more implementations, the document is read by a document reader (e.g., data processing device 105). Next, a key-value pair is identified at the root level of the document, step 406. The order of key-pair identification is indifferent, meaning the method 400 can process any key-value pair at the present document path level first, regardless of where that key-value pair is stored by location (e.g., it does not have to process the first pair listed in the document first).

Continuing with reference to FIG. 4, at step 408, the method 400 generates a root level tabular structure as a value storage location. For example, tabular structure generation preferably includes generation of a table having one or more columns and at least one row for storing document data. Further, in tabular structure generation, the name of the root level tabular structure is defined as the data source identifier (e.g., a database name) or collection name that the document is stored within, and at least one column of the tabular structure is defined according to the key name and value type of the identified key-value pair. Next, the value associated with the key-value pair is determined, step 410. For example, a data processing apparatus can implement program code (e.g., structure extractor 125) to determine whether the value type is a scalar value (e.g., an integer, a double, a Boolean, a string, etc.) or a composite value (e.g., an array, a nested subdocument, etc.). If the value of the key-value pair is determined to be a scalar value, then the method branches to step 412 and the key name is extracted. For example, the key name is extracted and a column is generated in the tabular structure according to the column generation method 500, described below. Thereafter, the value of the key-value pair is stored in a row of the tabular structure and mapped to the generated column, step 414.

However, if at step 410, the value type of value associated with the key value pair is determined to be a composite value by the data processing apparatus, then the method branches to step 416 and the key name is extracted. For example, the key name is extracted and a column is generated in the tabular structure according to the column generation method 500, described below. Next, a sub-tabular structure associated with the extracted key name is generated, step 418. For example, the sub-tabular structure is generated in the same way that the root tabular structure is (e.g., as a table having columns and rows), except that the sub-tabular structure references the root tabular structure (and any other intervening tabular structures) by a table reference. The name of the sub-tabular structure is defined, in one or more embodiments, as the data source identifier or collection name, followed by an underscore, followed by the extracted key name. In one or more embodiments, a referential column is generated in both the tabular structure and the sub-tabular structure that links the two. For example, a Boolean type column linking the sub-tabular structure as a child of the parent tabular structure is generated, as shown in FIGS. 8-12 and described herein. As composite values contain data stored in subdocuments, in order to ensure that all document data is processed and mapped to a table, values identified as composite are pushed to a temporary data structure, step 420. For example, the temporary data structure can be an elementary data structure, such as a stack, a link list, a double link list, an array, a queue, etc.

Whether the value of the key-value pair is determined to be a scalar value or a composite value, the method 400 branches to step 422, in which the method determines whether there are additional key-value pairs to process at the present document level. According to the method 400, before progressing to the next sub-document level, each of the scalar values at a given document level must be processed and stored in a tabular structure, and each of the composite values at that same document level must have generated referenced sub-tabular structure and pushed the nested values to a temporary data structure. If there are additional key-value pairs at the present document level not yet processed, then the method 400 branches to step 410. If there are no further key-value pairs at the present document level, then the method branches to step 424 and determines whether there is data in the temporary data structure. For example, if a composite value was identified in steps 410-420, then there will be data in the temporary data structure.

If the method 400 determines that there is data in the temporary data structure, the method branches to step 426 and changes the value storage location to the generated sub-tabular structure. In other words, the method steps down a document level (e.g., from root to nested level 1, or nested level 1 to 2, etc.) in order to store nested data. Thereafter, the method loops to step 410 and processes the next level of data. In this way, the method 400 provides a recursive method for traversing a document having source key-value pairs. If, at step 424, the method 400 determines that there is no data in the temporary data structure, the method branches to step 428 and ends. For example, there is no data in the temporary data structure when a document has no composite key-value pairs, or if all composite key-value pairs in the document have been processed.

Figure 5:
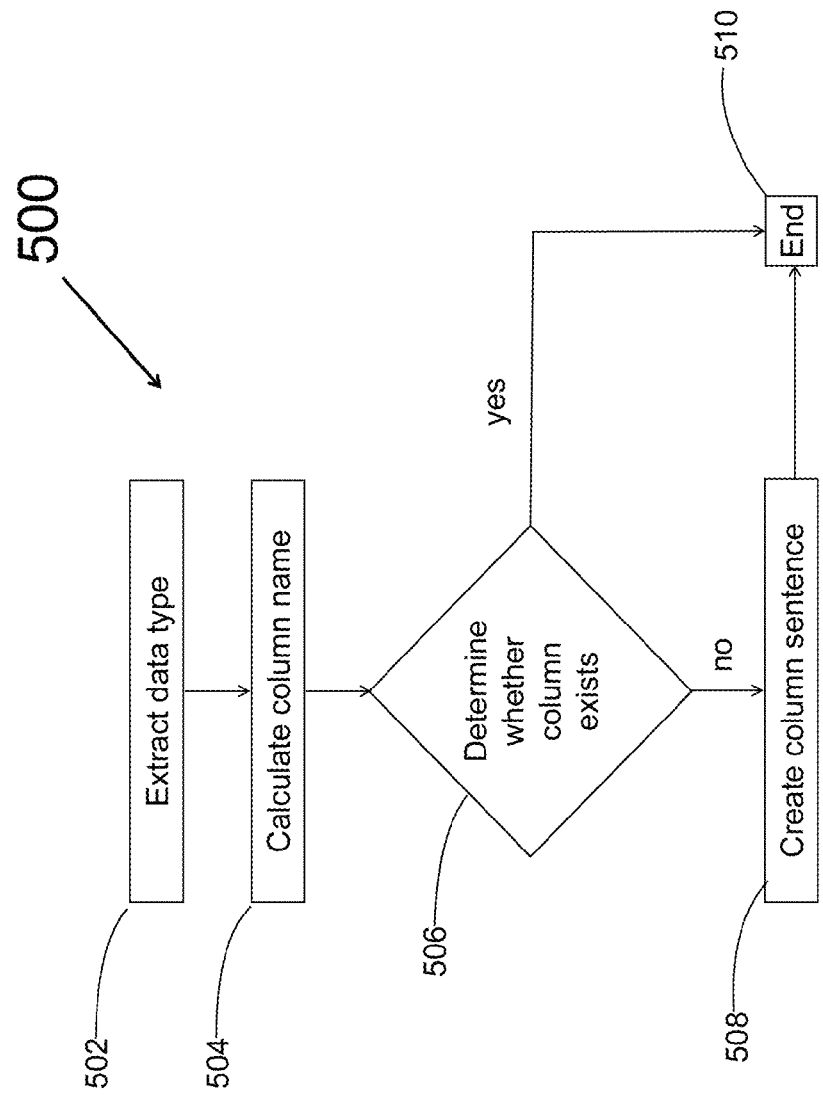
FIG. 5 presents a method flow illustrating a method for generating tabular structure columns according to one embodiment of the present invention.

With reference now to FIG. 5, a column generation program flow 500 illustrates column generation of a table for storing document data according to one or more embodiments herein. Although the present application can provide document data extraction and mapping to existing tables having reference to particular document elements, the present application advantageously provides for processing documents having unstructured data, with no reference to existing tabular structures. In instances in which no tables presently exist for document data, the columns for data tables are created and referenced by metadata to the document data during structure extraction (e.g., structure extractor 125, step 310 of method 300). The column generation method 500 begins at step 502 in which the key name and data type of the key-value pair are extracted. Data type extraction involves extracting the key name, value and value type (e.g., single, double, string, Boolean, etc.) of a key-value pair. For example, in step 502, if the key-value pair being mapped has a key name of "pizza" and the value is a string containing "pepperoni," "pizza" is extracted for the generated column, "pepperoni" is extracted for storage in a table row, and "_s" is extracted for the generated column. Other data types have different extensions depending on value type, such as _i for integer, _d for double, _b for Boolean, etc.

Next, at step 504, the column name is calculated. For example, continuing with the pizza example, a column name of "pizza_s" is generated. The method 500 then determines whether a generated column already exists having the calculated column name, step 506. If the column does not exist, the method 500 creates a column having the generated name, step 508. If the column does exist, the method ends, step 510. Thereafter, extracted data is stored in the column. For example, "pepperoni" would be stored in a data row and mapped to "pizza_s" in the above example. Furthermore, in one or more embodiments, if the key-value pair being extracted is in the root level of the document, the name of the table will be set to the name of the collection or any equivalent naming it is provided to the set of related documents. For example, if the collection storing the exemplary "pizza" key-value pair was named "foods," then the table name will be set to "foods."

Figure 6:
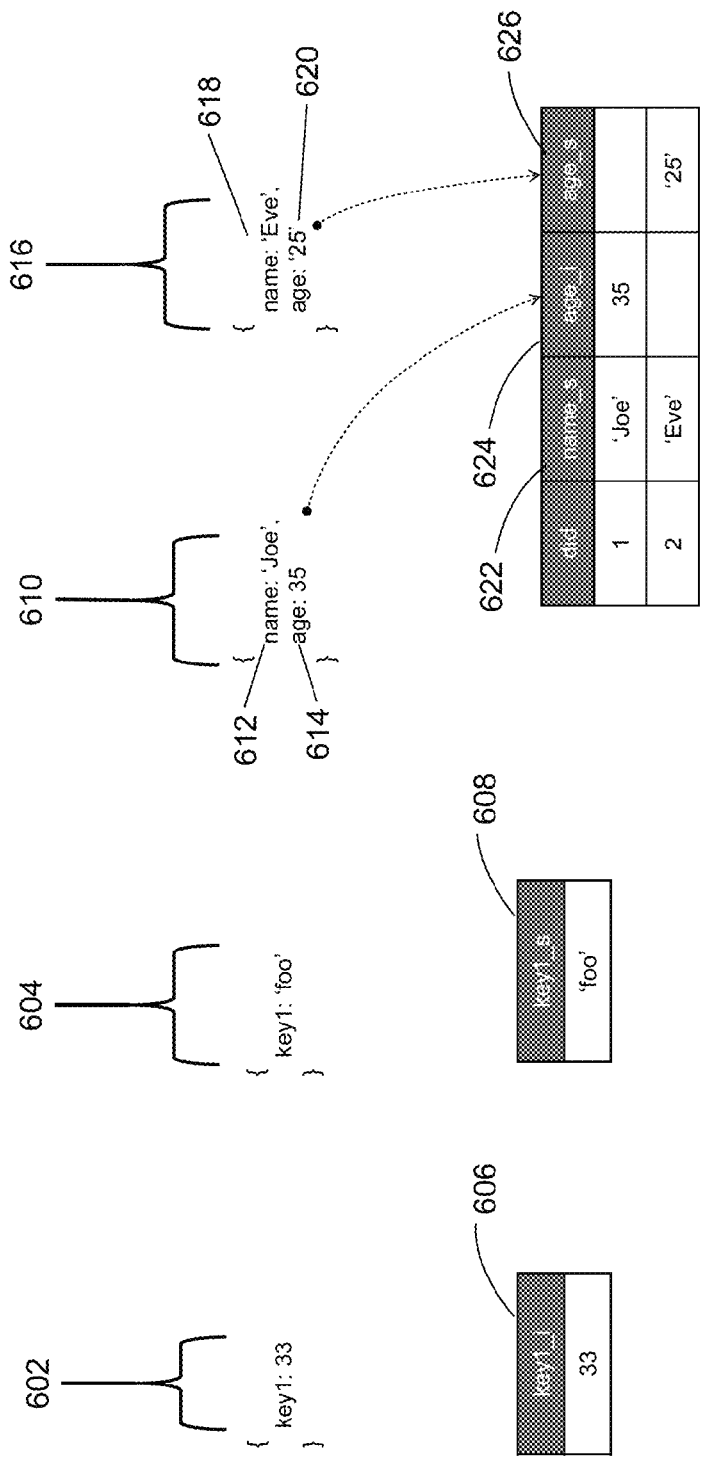
FIG. 6 presents an illustration depicting the resolution of value type conflicts according to one embodiment of the present invention.

If a document has more than one key-value pair having an identical key name, but having conflicting value types, then the method of generating tabular structure takes particular steps in one or more embodiments. Such conflict is common problem faced by conventional documental database systems. Two such examples are illustrated by FIG. 6. In the first example, the input document includes a first key-value pair 602 having a key name of "key1" and an integer value of 33, and a second key-value pair 604 also having a key name of "key1", but is a string type having a value of 'foo'. Then, the column generation method 500 generates a first column 606 of "key1_i" that corresponds to the first key-value pair 602, and a second column 608 of "key1_s" that corresponds to the second key-value pair 604. In this case, the type conflict does not require additional steps beyond those in method 500, as the method generates two columns having different names, despite each key-value pair having the same key name. In the second example, a first set of key-value pairs 610 includes a first key-value pair 612 having a key name of "name" and a string value of 'Joe', and a second key-value pair 614 having a key name of "age" and an integer value of 35. A second set of key-value pairs 616 includes a third key-value pair 618 having a key name of "name" and a string value of 'Eve', and a fourth key-value pair 620 having a key name of "age" and a string value of '25'. Upon implementing the column generation method 500, since both the first key-value pair 612 and third key-value pair 618 have the same key name and value type, there is no conflict and a first column 622 is generated having a metadata reference of "name_s" and 'Joe' and 'Eve' are stored in data rows in their order of processing. However, the second key-value pair 614 and fourth key-value pair 620 are in type conflict because they both have key names of "age", but the second key-value pair is an integer, whereas the fourth key-value pair is a string. To remedy this, two separate columns are generated, a second column 624 referenced by "age_i" and a third column 626 referenced by "age_s". Their respective values are mapped to these columns, and the rows that have no key-value pair referencing that column are left empty, as shown in FIG. 6.

In order to perform bi-directional mapping between the key-value pairs and a tabular system, as described above, the systems and methods of the present application implement metadata references. In one or more embodiments, metadata storage takes place among one or more metadata tables that reference the column definitions of the data tables that represent the document data. Metadata serves two main purposes. First, as metadata references the table columns that represent the document in its original form, it provides a link to the original document structure, thereby allowing reconstruction of the original document. Second, metadata references are not implementation-dependent, meaning that it can reference different tabular structures or relational databases, whether fully persistent, partially persistent, or not persistent.

Figure 7:
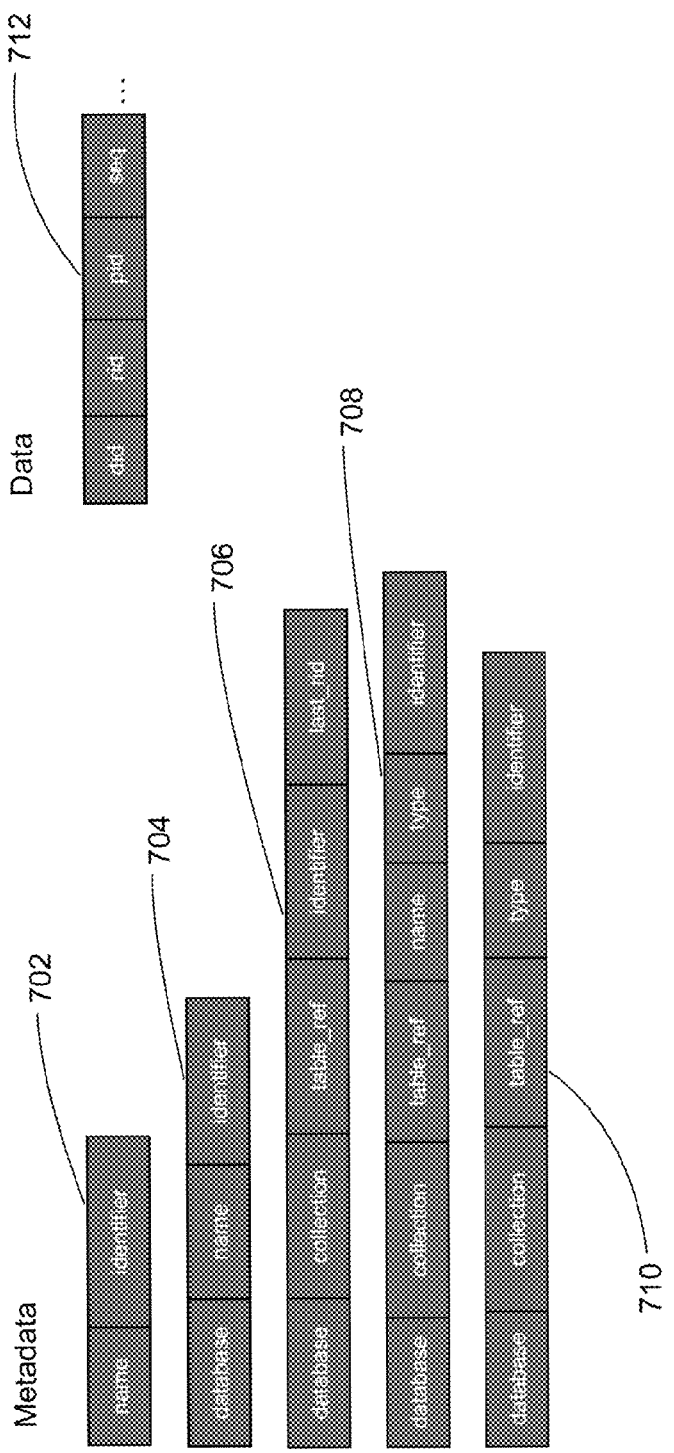
FIG. 7 presents an illustration depicting an exemplary metadata table generation according to one embodiment of the present invention.

With reference now to FIG. 7, an exemplary set of metadata tables according to one or more embodiments is illustrated. This example set of metadata tables is merely one way in which metadata can reference document data tables, and is not meant to limit the present application to only this set of tables. A data source metadata table 702 is provided to store references to the data source containing a given document. It includes two columns, one defined as "name", which is assigned by the user to the data source, and one defined as "identifier", which is an internal identifier generated as by the data mapping method herein. Typically, these two are the same, though the "identifier" column can be different in implementations having a data source that is a persistent database, as database names can be accessed and modified in persistent databases. In one or more embodiments, the "identifier" column is generated to overcome data access ("back end") limitations inherent to the destination storage. For example, the "identifier" column is generated if the back end does not allow certain type of identifiers, such as a leading identifying number, or has identifier length limitations. A collection metadata table 704 is provided when the data source is a database having one or more collections in order to store references to a particular collection containing a given document in the database. Collection metadata table 704 includes the same columns as the data source metadata table 702, and also adds a third "database" column that references the data source metadata table.

As a document is processed, such as by method 300 or method 400, its level structure and subdocuments (e.g., composite values, nested documents) are registered and mapped to particular tabular structures. A document index metadata table 706 is provided to store references to data stored in document paths and the subdocuments therein. A document path is an ordered list, starting from the root level, of keys to travel to arrive at a given value. For example, the document index metadata table 706 includes a "database" column as above, a "collection" column that references the collection metadata table 704, a "table_ref" column that references the document path, an "identifier" column that references the internal identifier to the path of the document and matches with at least one generated data table, and a "last_rid" column that references the last row in the identified generated data table.

As each key-value pair in a document is processed, a reference between the original document key and the identifier stored by the system is stored. For example, this reference is stored a key metadata table 708. The key metadata table 708 can include "database", "collection", and "table_ref", columns as above. Further, the key metadata table 708 can include a "name" column that is a reference to the key name of a key-value pair in the document (and not the name of the data source, as that is already referenced in the "database" column), a "type" column that references the data type for a key-value pair (whether scalar or composite), and an "identifier" column that references the internal identifier of the key and matches with a row in the document index metadata table 706 by columns "database", "collection" and "table_ref".

As documents can include both scalar values and composite values, such as a key-value pair having an array, an array metadata table 710 can be included to account for composite key-value pairs containing arrays of scalar values. The array metadata table 710 can include column references for "database", "collection", and "table_ref" as above. Moreover, the array metadata table 710 can include a "type" column to indicate the type of data stored in the array, including a reference for each row in the table from the array, and an "identifier" column that references the internal name of the column that the value is stored in the table related to the document path.

Furthermore, FIG. 7 additionally illustrates four automatically generated columns 712 for data tabular structures according to one or more embodiments. These automatically generated columns 712 provide metadata-like functionality in that they store the relationship between all the values of a same document. For example, as illustrated by FIG. 7, the "did" column is a document identifier that uniquely identifies the document and all rows in all tables from the same collection originating from the same unique document; the "rid" column identifies rows of the current table to differentiate in instances in which a table contains more than one row for the same did (e.g., an array); the "pid" column is a parent identifier that references the parent row (e.g., the row that the nested key-value pairs depend from); and the "seq" column references the order of elements in an array (e.g., to reconstruct the document in its original format if necessary). However, depending on the level of the table and the document content, all columns may not be necessary. For example, at the root level of a document, only the "did" column is necessary, as the order does not matter, can only have a single row, and has no parent row to depend from.

Similarly, a second level subdocument (e.g., a first nested document) only needs the "did" and "rid" columns as long as the subdocument is not an array. In one or more implementations, the present application performs automatic optimizations to automatically generate only necessary column data. In this way, computer resources are saved, such as memory and storage space, which is particularly advantageous for persistent databases that can be continually modified.

With reference now to FIGS. 8-12, an example document 800 having a plurality of key-pairs is processed, and the data contained in the key-value pairs is mapped to generated tabular structures. This example is provided for illustrative purposes in order to more fully describe the systems and methods of one or more embodiments described herein, but the application is not meant to be limited to only this example.

Figure 8:
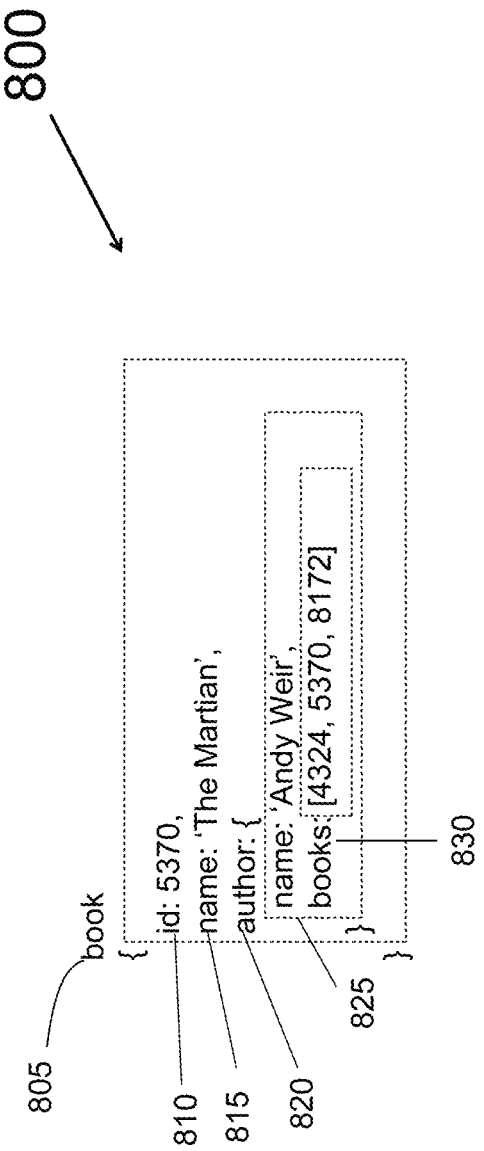
FIG. 8 presents an exemplary document structure containing a plurality of key-value pairs for processing to a tabular structure according to one embodiment of the present invention.

Referring first to FIG. 8, the document 800 is received from a data source for processing. The document 800 contains data regarding identifying information about the book "The Martian" by Andy Weir. For example, the document 800 could be a record stored in a library database. In this example, the document 800 includes a name 805 of "book." The name 805 can be user-assigned, or automatically assigned as a reference to the collection that the document is stored in, or the data source itself. There are three key-value pairs stored in the root level of the example document 800: a first key-value pair 810 directed to an identifying value of the book, a second key-value pair 815 directed to the name of the book, and a third key-value pair 820 directed to the author of the book. The first key-value pair 810 has a key of "id" and a scalar value of 5370 stored as a double type. The second key-value pair 815 has a key of "name" and a scalar value of 'The Martian' stored as a string type. The third key-value pair 820 has a key of "author" and a composite value of a nested subdocument containing a fourth key-value pair 825 (directed to the name of the book author) and a fifth key-value pair 830 (directed to other book ids having the same author). Because the third key-value pair 820 is a composite value, the document 800 stores the fourth key-value pair 825 and the fifth-key value pair 830 in a sub-level. The fourth key-value pair 825 has a scalar value of 'Andy Weir' stored as a string type. The fifth key-value pair 830 has a composite value of an array, the array itself containing three scalar values each stored in a further sub-level.

Figure 9:
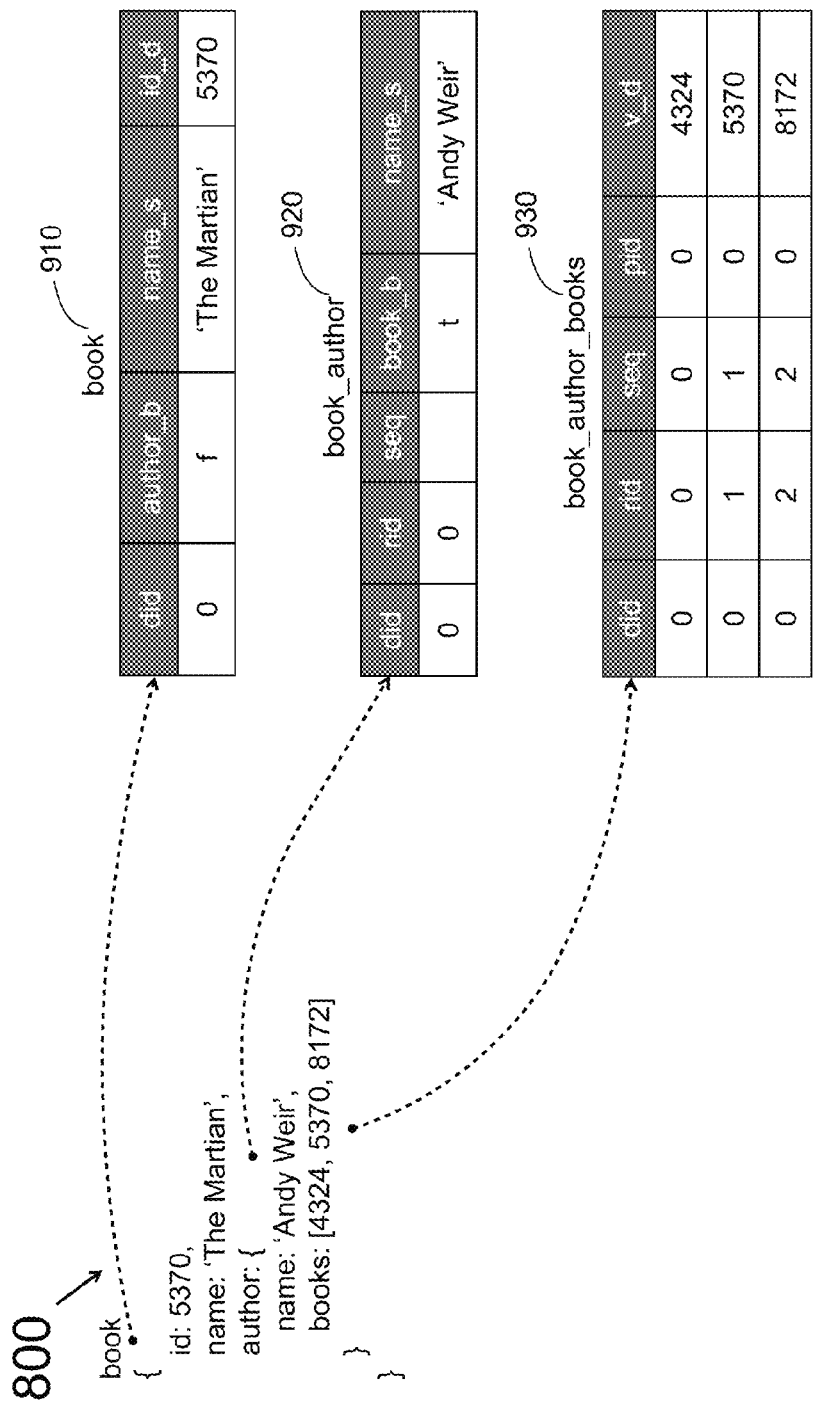
FIG. 9 presents an illustration depicting the document data of the document of FIG. 8 as mapped to resultant a generated tabular structure according to one embodiment of the present invention.

Turning now to FIG. 9, the tabular structure generated and mapped by the document 800 according to the methods for extracting document data and mapping that data to tabular structure as described in one or more embodiments herein is illustrated (e.g., by method 300, method 400). In the example document 800, the five key-value pairs are processed and mapped to three tables according to the nested data of the document: a root level table 910, a first sub-level table 920 depending from the root level table, and a second sub-level table 930 depending from the first sub-level table. As shown by FIG. 9, the first key-value pair 810 and the second key-value pair 815 stored in the root level of document 800 are mapped to the root level table 910, the third key-value pair 820 is mapped to the first sub-level table 920 by virtue of having a nested subdocument, and the fourth key-value pair 825 and the fifth key-value pair 830 are mapped to the second sub-level table 930. The information used to populate the column names and data rows of the tabular structures used to provide table structure and definition is provided by reference to the metadata, as is described in regard to FIGS. 5-7.

Figure 10:
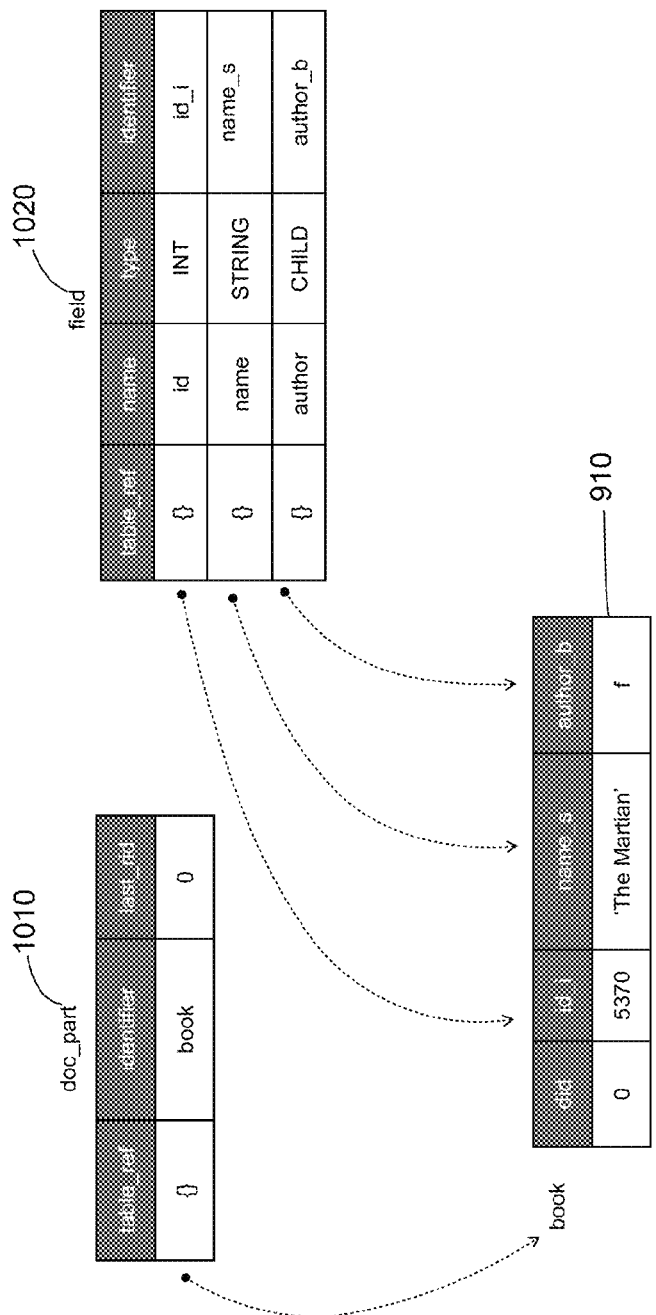
FIG. 10 presents an illustration depicting the root level processing of the exemplary document of FIG. 8 according to one embodiment of the present invention.

With reference now to FIG. 10, the generation of the root level table 910 and the mapping of the first key-value pair 810 and the second key-value pair 815 is illustrated. To avoid possible limitations resulting from the storage implementation used, one internal name is assigned for each appearing identifier, and used throughout the data mapping process. In one or more embodiments, the document 800 level structure is processed to generate one or more metadata tables to provide a document path index for the key-value pairs stored therein. For example, reference between the original name and the internal name is stored in the metadata tables. In the example, a doc_part metadata table 1010 provides reference identifiers to define the root level table 910 structure. The root level table 910 in this example is named "book" on the basis of an identifier of the root level, which is in view of the collection or data source in which the document 800 is stored. The "table_ref" column of the doc_part metadata table 1010 is an empty set as the root level table 910 does not depend from any higher order tables (it is at the root level).

The field metadata table 1020 defines additional column structure of the root level table 910 according to the column generation method 500. As is illustrated by FIG. 10, the root level table 910 references the field metadata table 1020 to generate columns of "id_i" (referencing the first key-value pair 810 and integer value type), "name_s" (referencing the second key-value pair 815 and string value type), and "author_b" (referencing the third key-value pair 820 and Boolean value type). In other embodiments in which the table being mapped to is pre-existing (e.g., a root level table named "book" already exists), these metadata column generation steps are not necessary as long as the key-value pair data types match. Thereafter, a data row is generated in the root level table 910 and is populated with the data values of the root level key-value pairs (e.g., 5370, 'The Martian', and false—meaning this value is a subdocument). For composite values, such as the third key-value pair 820, the values are not stored in the root level table 910. Instead, these values are pushed to a temporary data structure for later processing. The methodology of an exemplary temporary data structure, e.g., a stack operation is shown in FIG. 13 and described more fully below. The process continues until each scalar key-value pair at the root level is extracted and mapped to the root level table 910.

Figure 11:
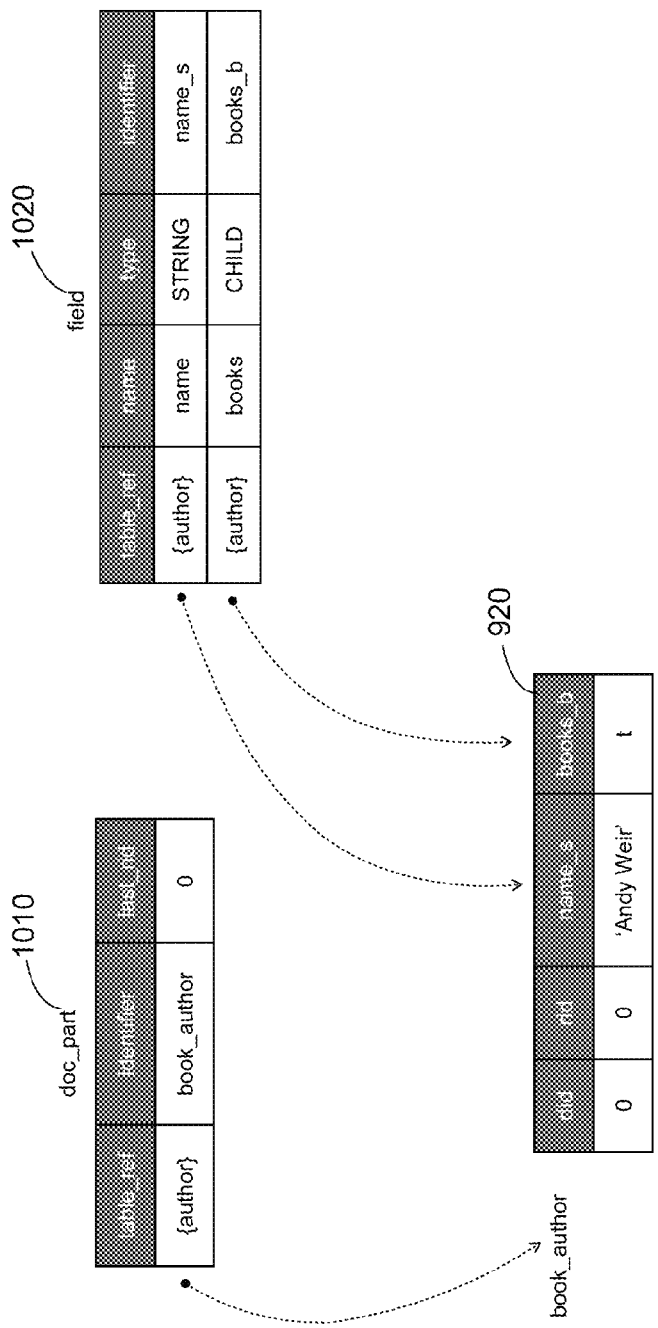
FIG. 11 presents an illustration depicting the first sub-level processing of the exemplary document of FIG. 8 according to one embodiment of the present invention.

With reference now to FIG. 11, the generation of the first sub-level table 920 and mapping of the third key-value pair 820 and the fourth key-value pair 825 is illustrated. The methodology for generating the first sub-level table 920 is similar to that of generation for the root level table 910, except that additional metadata reference columns are generated. In the example, the doc_part metadata table 1010 provides reference identifiers to define the first sub-level table 920 structure (e.g., a document path). For example, the first sub-level table 920 in this example is named "book_author" as the "table_ref" column of the doc_part metadata table 1010 now includes a reference to "author", which is the key name of the third key-value pair 820 and the present document level. As above, the field metadata table 1020 defines additional column structure of the first sub-level table 920 according to the column generation method 500. Here, the first sub-level table 920 references the field metadata table 1020 to generate columns of "name_s" (referencing the fourth key-value pair 825 and string value type), and "books_b" (referencing the fifth key-value pair 830 and Boolean value type). Thereafter, a data row is generated in the first sub-level table 920 and is populated with the data values of the book_author level key-value pairs (e.g., 'Andy Weir' and true—meaning this is an array). The composite value fifth key-value pair is pushed to a temporary data structure for later processing. This temporary data structure can be the same or different from the temporary data structure for receiving pushed composite values at the root level.

Figure 12:
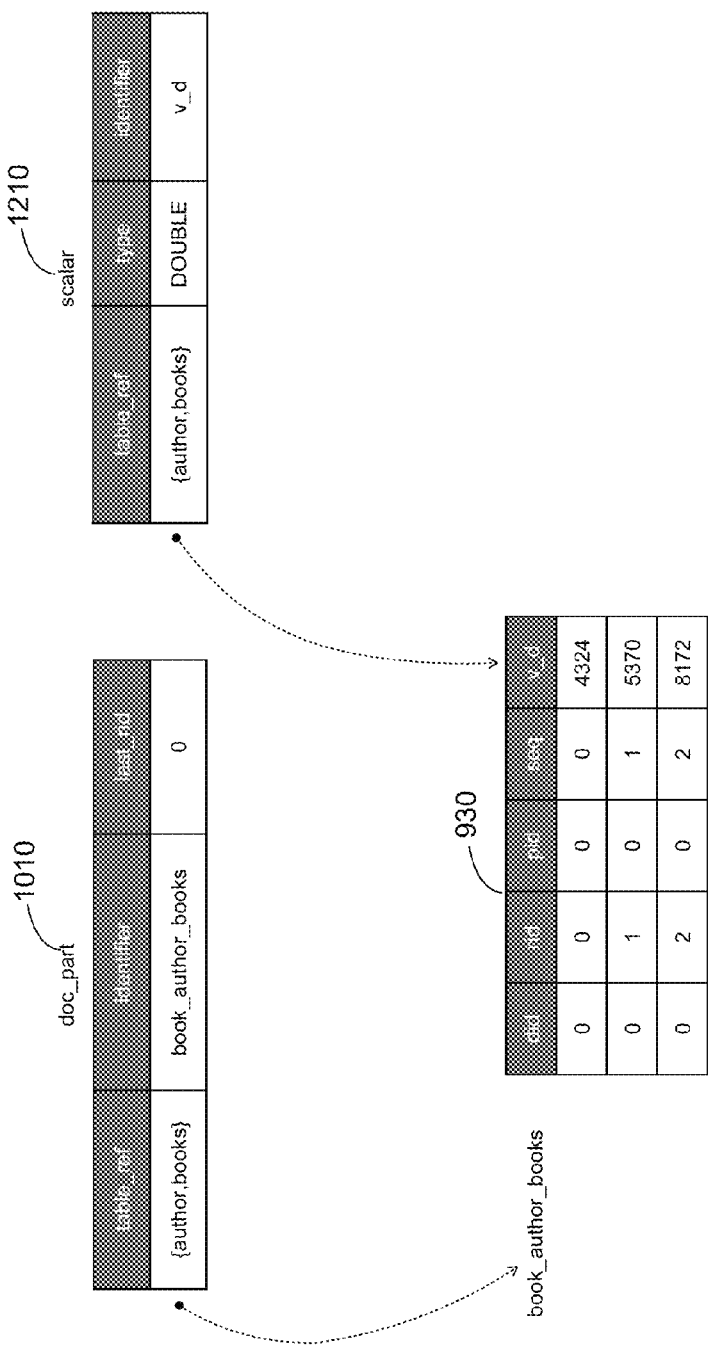
FIG. 12 presents an illustration depicting the second sub-level processing of the exemplary document of FIG. 8 according to one embodiment of the present invention.

With reference now to FIG. 12, the generation of the second sub-level table 930 and the mapping of the fifth key-value pair 830 is illustrated. As with the book_author level, the doc_part metadata table 1010 provides an identifier to define the second sub-level table 930. In this case, the fifth key-value pair 830 has a key name of "books", which is added to the "table_ref" column of the doc_part metadata table 1010 to generate a second sub-level table 930 name of "book_author_books". The fifth key-value pair 830 is an array representing three scalar values and the methodology provided herein generates a scalar metadata table 1210 having a column representing the double value data type of the fifth key-value pair Like the root level table 910 and the first sub-level table 920, a data row is generated to store the processed value of the fifth key-value pair 830; however, as there are three scalar values, three data rows are generated and the values are mapped to a column "v_d" (e.g., "value" of double type). To maintain order integrity of these values, the second sub-level table 930 generates a "rid" column (to identify the row) and a "seq" column (to identify the sequence of the values in the array). As there are no further composite values in the document 800, the process ends and the three created data tables are stored at a database or other desired storage location.

With reference now to FIG. 13, an exemplary stack operation 1300 of a temporary data structure processing is illustrated. In one or more implementations, a stack operation 1300 is implemented to temporarily store composite value data while scalar value data is processed, thereby providing enhanced data mapping efficiency and ensuring that no document data is omitted. Other temporary data structures are suitable for use with embodiments of the present invention, such as link lists, double link lists, queues, arrays, and the like. Stack operation 1300 implements a LIFO ("last in, first out") processing methodology in which a process pushes data onto the stack until the appropriate processing time, at which time the data is "popped" off the stack and processed. In one or more embodiments, stack operation 1300 is order-indifferent, meaning that processing of the key-value pairs of a document can take place in any order according to document path level. Stack operation 1300 is iterative, meaning that it repeats until the data temporarily stored there is entirely processed.

FIG. 13 illustrates the document path of a document 1305 having eight key-value pairs, some of which are nested composite values. In this example, keys 1, 3, 4, 6, and 8 are scalar value types, and keys 2, 5, and 7 are composite value types. As the stack operation 1300 is order-indifferent, FIG. 13 illustrates two different processing orders according to particular embodiments. In either order, both the processing time and resultant table mapping is similar.

The first order 1310 processes key-values according to document path appearance. In the first order 1310, the stack is initially empty. In the first iteration of stack operation 1300, the root level of the document 1305 is read, and any scalar values are processed according to the extraction and mapping methods described herein. In this case, the only scalar value in the root level is "key1". Keys "key2" and "key7" are composite values and are pushed to the stack in the order that they appear, meaning that since key "key2" appears first in the document path, it will be placed on top of "key7" for processing in the first order 1310. Next, the stack operation performs a second iteration to process the key-value pairs stored therein. As stack operation 1300 is a last in, first out operation, the top-most composite value stored in the stack, e.g., "key2", is processed first. Key "key2" includes two scalar values ("key3" and "key4"), which are extracted and mapped to a data table. Key "key5" is a nested subdocument and is pushed to the top of the stack. However, now key "key5" is the top-most key-value pair, and the second iteration pauses processing of "key2" and iterates the stack operation 1300 a third time to process "key5". Key "key 5" contains a single scalar, key "key 6," which is processed. As there are no further key-value pairs at this level, key "key5" is removed from the stack and the first order 1310 returns to where it paused on the second iteration. Key "key2" also does not have any further key-value pairs, and so it is removed from the stack. The first order 1310 then iterates a fourth time to process key "key7", which has a single scalar "key8". Then, with no data stored in the stack, the stack operation 1300 ends.

In the second order 1320, processing of a given key-value pair at a given level is read to add composite values to the stack before processing any stack data. As above, the second order 1320 begins with an empty stack. Upon the first iteration, the stack operation 1300 identifies two composite values, "key2" and "key7", and pushes them to the stack in the order that they appear, rather than their order in the document, meaning that "key2" is read first and pushed to the stack first, and then "key7" is pushed on top. Upon the second iteration, the stack operation 1300 processes "key7" data and removes it from the stack. Upon the third iteration, the stack operation 1300 processes "key2" data, identifies "key5" as a composite value, and pushes "key5" to the stack. Upon the fourth iteration, the stack operation 1300 processes the "key5" data to completion, removes the "key5" structure, then completes processing of the "key2" data.

FIGS. 1 through 13 are conceptual illustrations allowing for an explanation of the present invention. Those of skill in the art should understand that various aspects of the implementations of the present invention could be implemented in hardware, firmware, software, or combinations thereof. In such implementations, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary implementations, but should be defined only in accordance with the following claims and their equivalents.

What is claimed is:

1. A method for mapping one or more key-value pairs associated with a document into one or more tabular structures, the one or more key-value pairs each having a key name and a value, and each of the one or more tabular structures having one or more rows and columns for storing the values, the method comprising:
   reading the document, by a document reader, to identify the one or more key-value pairs associated with the input document;
   determining whether a value associated with a given one of the one or more key-value pairs is a scalar value or a composite value;
   in the event that the value associated with the key-value pair is a scalar value:
      extracting the key name of the key-value pair,
      storing the value of the key-value pair in a row of the tabular structure, or
   in the event that the value associated with the key-value pair is a composite value:
      extracting the key name of the key-value pair;
      generating a sub-tabular structure associated with the extracted key name of the key-value pair.

2. The method of claim 1, further comprising:
   in the event that the value associated with the key-value pair is a composite value:
      pushing the value of the key-value pair to a temporary data structure.

3. The method of claim 2, further comprising:
   determining whether the composite value associated with a key-value pair pushed to the temporary data structure includes one or more sub-key-value pairs;
   determining whether the one or more sub-key-value pairs are a scalar value or a composite value for each of the one or more sub-key-value pairs;
   in the event that the value associated with the sub-key-value pair is a scalar value:
      extracting the key name of the sub-key-value pair,
      checking whether the sub-tabular structure has a column associated with the extracted key name of the sub-key-value pair, and
         if so, storing the value of the sub-key-value pair in a row of the sub-tabular structure and mapping the value of the sub-key-value pair to the column, or
         if not, generating a new column associated with the sub-tabular structure, storing the value of the sub-key-value pair in a row of the sub-tabular structure and mapping the value of the sub-key-value pair to the new column;
   in the event that the value associated with the sub-key-value pair is a composite value:
      extracting the key name of the sub-key-value pair;
      generating a new sub-tabular structure associated with the extracted key name of the sub-key-value pair; and
      pushing the value of the sub-key-value pair to the temporary data structure;
   in the event that no value associated with the sub-key-value pair is a composite value, removing the pushed key-value pair from the temporary data structure.

4. The method of claim 3, further comprising iterating the steps of claim 3 until the temporary data structure contains no pushed key-value pairs.

5. The method of claim 1, further comprising in the event that the value associated with the key-value pair is a scalar value, checking whether the tabular structure has a column associated with the extracted key name of the key-value pair.

6. The method of claim 5, further comprising generating a new column associated with the tabular structure and storing the value of the key-value pair in a row of the tabular structure.

7. The method of claim 5, wherein the column is identified by a type associated with the value of the key-value pair.

8. The method of claim 1, wherein the document is in JSON format.

9. The method of claim 1, wherein the document is in XML format.

10. The method of claim 1, wherein the tabular structure is a persistent storage.

11. The method of claim 1, wherein the document is input from a data source.

12. The method of claim 1, wherein the data source is a relational database.

13. The method of claim 1, wherein the temporary data structure is a stack operation.

14. The method of claim 1, wherein temporary data structure is a linked list.

15. The method of claim 1, further comprising:
in the event that the value associated with the key-value pair is a composite value:
recursively iterating the steps of claim 1 until each of the one or more key-value pairs has been extracted to a tabular or sub-tabular structure.

16. A system for extracting and storing document data into a database, the system comprising:
a data processing apparatus including a processor and a memory coupled to the processor;
a data source containing one or more documents, each document having one or more key-value pairs, and each key-value pair having a key name and a value, each value having a value type;
a document reader for receiving the document from the data source over a network, the document reader being communicatively coupled to the data processing apparatus;
a structure extraction module implementing program code by the processor to generate one or more tabular structures having at least one column corresponding to the key name and value type of each of the one or more key-value pairs;
a data extraction module implementing program code by the processor to extract the value to a data row in the one or more tabular structures created by the structure extraction module; and
one or more metadata tables generated by the structure extraction module with reference to the one or more tabular structures.

* * * * *